(12) United States Patent
Kim

(10) Patent No.: US 9,111,667 B2
(45) Date of Patent: Aug. 18, 2015

(54) GRAPHENE TRANSFER METHOD

(71) Applicant: SAMSUNG TECHWIN CO., LTD., Changwon (KR)

(72) Inventor: Na-young Kim, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 0 days.

(21) Appl. No.: 14/348,128

(22) PCT Filed: Sep. 21, 2012

(86) PCT No.: PCT/KR2012/007565
§ 371 (c)(1),
(2) Date: Mar. 28, 2014

(87) PCT Pub. No.: WO2013/048063
PCT Pub. Date: Apr. 4, 2013

(65) Prior Publication Data
US 2014/0284303 A1    Sep. 25, 2014

(30) Foreign Application Priority Data

Sep. 29, 2011 (KR) .................. 10-2011-0098941

(51) Int. Cl.
*C03C 25/68* (2006.01)
*H01B 13/00* (2006.01)
(Continued)

(52) U.S. Cl.
CPC ............. *H01B 13/00* (2013.01); *B82Y 30/00* (2013.01); *B82Y 40/00* (2013.01); *C01B 31/0438* (2013.01); *C01B 31/0469* (2013.01); *C01B 31/0484* (2013.01)

(58) Field of Classification Search
CPC .... B82Y 30/00; B82Y 40/00; C01B 31/0438; C01B 31/0484; B05D 1/20
USPC ...................................................... 216/36, 54
See application file for complete search history.

(56) References Cited

U.S. PATENT DOCUMENTS

| 8,137,740 B2 | 3/2012 | Lee et al. |
| 2011/0108521 A1 | 5/2011 | Woo et al. |

(Continued)

FOREIGN PATENT DOCUMENTS

| JP | 7-108235 A | 4/1995 |
| KR | 10-2010-0102381 A | 9/2010 |

(Continued)

OTHER PUBLICATIONS

International Search Report (PCT/ISA/210) dated Feb. 20, 2013, issued in International Application No. PCT/KR2012/007565.

(Continued)

*Primary Examiner* — Roberts Culbert
(74) *Attorney, Agent, or Firm* — Sughrue Mion, PLLC

(57) ABSTRACT

A graphene transfer method comprising: attaching a first end of a first stacked structure, including a catalyst metal, graphene, and a supporting body stacked in the order stated, to a point of a target film that is transported in a roll-to-roll manner in a first direction; forming a second stacked structure by removing the catalyst metal of the first stacked structure, the second stacked structure having a surface whereon the graphene is exposed; and transferring the exposed graphene to a transfer surface of the target film by transporting the target film in a roll-to-roll manner and the second stacked structure in the first direction.

8 Claims, 5 Drawing Sheets

(51) Int. Cl.
*B82Y 30/00* (2011.01)
*C01B 31/04* (2006.01)
*B82Y 40/00* (2011.01)

(56) References Cited

U.S. PATENT DOCUMENTS

2012/0258311 A1\* 10/2012 Hong et al. ................... 428/408
2012/0282419 A1\* 11/2012 Ahn et al. .................... 428/34.8

FOREIGN PATENT DOCUMENTS

| KR | 10-2011-0042023 A | 4/2011 |
| KR | 10-2011-0052300 A | 5/2011 |
| KR | 10-2011-0084110 A | 7/2011 |

OTHER PUBLICATIONS

Written Opinion (PCT/ISA/237) dated Feb. 20, 2013, issued in International Application No. PCT/KR2012/007565.

\* cited by examiner

[Fig. 10]

GRAPHENE TRANSFER METHOD

TECHNICAL FIELD

One or more embodiments of the present invention relate to a graphene transfer method for automating the transfer of graphene.

BACKGROUND ART

Graphene is a material in which carbon atoms are connected to each others in a hexagonal shape that forms a honeycomb-like 2-dimensional plane structure. Graphene has very high electric conductivity due to its small thickness and transparency. Based on such properties, various attempts for using graphene in transparent display devices or flexible display devices have been attempted. Thus, given the strong potential and high interest in graphene, a method for mass-producing high-quality graphene is needed.

DISCLOSURE OF INVENTION

Technical Problem

In the related art, to transfer graphene synthesized on a catalysis metal, a thermal release tape is attached to graphene, the catalyst metal is removed, adhesiveness of the thermal release tape is reduced by applying predetermined heat and pressure thereto and graphene is transferred to a target film. However, graphene is damaged when the predetermined heat and pressure to remove the thermal release tape are applied, and thus, the surface resistance of the formed graphene increases. As a result, the electric properties of the formed graphene deteriorate. Therefore, a method for automating a graphene transfer process while reducing graphene damages by using a roll-to-roll method is needed.

Solution to Problem

One or more embodiments of the present invention include a graphene transfer method for automating a graphene transfer process while reducing graphene damages by using a roll-to-roll method.

Additional aspects will be set forth in part in the description which follows and, in part, will be apparent from the description, or may be learned by practice of the presented embodiments.

According to one or more embodiments of the present invention, a graphene transfer method includes attaching a first end of a first stacked structure, including a catalyst metal, graphene, and a supporting body stacked in the order stated, to a point of a target film that is transported in a roll-to-roll manner in a first direction; forming a second stacked structure by removing the catalyst metal of the first stacked structure, the second stacked structure having a surface whereon the graphene is exposed; and transferring the exposed graphene to a transfer surface of the target film by transporting the target film in a roll-to-roll manner and the second stacked structure in the first direction.

Advantageous Effects of Invention

As described above, according to the one or more of the above embodiments of the present invention, since an operation of etching a catalyst metal and an operation for transferring graphene are performed while graphene is being transported in a roll-to-roll manner in a direction, target films to which graphene is transferred may be mass-produced. Furthermore, since graphene is transferred by using a polymer supporting body and the polymer supporting body used for transferring the graphene may be removed without applying a predetermined heat and pressure, damages to the transferred graphene may be reduced.

BRIEF DESCRIPTION OF DRAWINGS

These and/or other aspects will become apparent and more readily appreciated from the following description of the embodiments, taken in conjunction with the accompanying drawings of which:

FIG. 10 is a schematic lateral sectional view of graphene transferred to a target film.

BEST MODE FOR CARRYING OUT THE INVENTION

Figure 1:
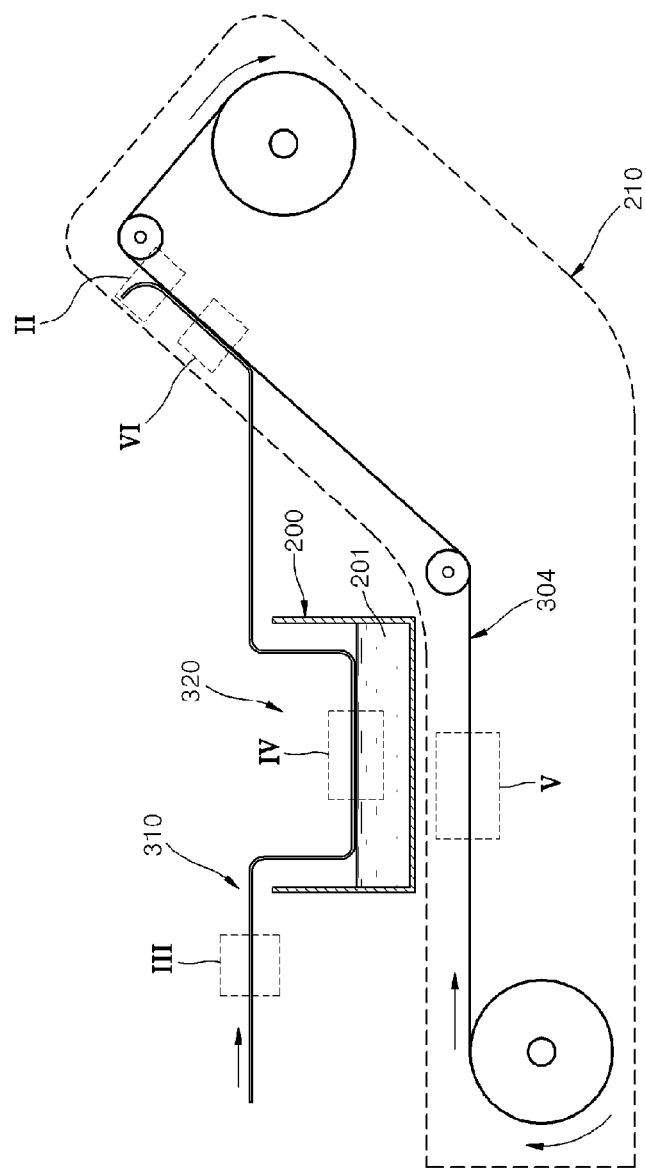
FIG. 1 is a schematic diagram showing a graphene transfer method according to an embodiment of the present invention.

According to one or more embodiments of the present invention, a graphene transfer method includes attaching a first end of a first stacked structure, including a catalyst metal, graphene, and a supporting body stacked in the order stated, to a point of a target film that is transported in a roll-to-roll manner in a first direction; forming a second stacked structure by removing the catalyst metal of the first stacked structure, the second stacked structure having a surface whereon the graphene is exposed; and transferring the exposed graphene to a transfer surface of the target film by transporting the target film in a roll-to-roll manner and the second stacked structure in the first direction.

The catalyst metal is removed via a wet-etching process by floating the first stacked structure at surface level in a catalyst metal removing liquid.

The wet-etching process is performed by using at least one from among hydrogen fluoride (HF), iron chloride ($FeCl_3$), iron nitride ($Fe(No_3)_3$), copper chloride ($CuCl_2$), ammonium persulfate (($NH_4)_2S_2O_8$), sodium persulfate ($Na_2S_2O_8$) solution, and a hydrogen peroxide/sulfuric acid type solution.

The graphene transfer method further includes, after the transferring of the graphene, transporting the target film in a roll-to-roll manner and the second stacked structure in a direction opposite to the first direction and cleaning the graphene transferred to the target film by floating the graphene on the surface of a cleaning liquid; and transferring the cleaned graphene back to the transfer surface of the target film by transporting the target film in a roll-to-roll manner and the second stacked structure in the first direction.

A container is filled with the catalyst metal removing liquid after the catalyst metal is removed, and the catalyst metal removing liquid is discharged from the container and the container is filled with the cleaning liquid before the cleaning of the graphene.

Roll-to-roll equipment for transporting the target film in a roll-to-roll manner is arranged inside or outside the container.

The supporting body is formed of at least one from among polymers including polymethylmethacrylate (PMMA), polyamide (PA), poly(butylenes terephtalate) (pbt), polycarbonate (pc), polyethylene (pe), poly(oxymethylene) (pom), polypropylene (pp), poly(phenylenether) (ppe), polystyrene (ps), polysulfone (psu), liquid crystal polymer (lcp), poly(etheretherketone) (peek), poly(etherimide) (pei), polylactide (pla), poly(dimethylsiloxane) (pdms), and cycloolefin copolymer (coc).

The graphene transfer method further includes, after the transferring of the graphene, removing the supporting body by using a supporting body removing liquid.

The catalyst metal includes at least one selected from among nickel (Ni), cobalt (Co), iron (Fe), platinum (Pt), gold (Au), aluminum (Al), chrome (Cr), copper (Cu), magnesium (Mg), manganese (Mn), rhodium (Rh), silicon (Si), tantalum (Ta), titanium (Ti), tungsten (W), uranium (U), vanadium (V), zirconium (Zr), and combinations thereof.

The target film contains at least one from among polyethylene terephthalate (PET), polyimide (PI), polydimethylsiloxane (PDMS), plastic, synthetic rubber, and natural rubber.

MODE FOR THE INVENTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as at least one of, when preceding a list of elements, modify the entire list of elements and do not modify the individual elements of the list.

FIG. 1 is a schematic diagram showing a graphene transfer method according to an embodiment of the present invention, and FIGS. 2 through 6 are schematic lateral sectional views of films including graphene in corresponding portions of FIG. 1. In FIGS. 1 through 6, the thicknesses of a catalyst metal 301, graphene 302, a supporting body 303, and a target film 304 are exaggerated for convenience of explanation.

First, although not shown in FIG. 1 in order not to obscure the gist of the present invention, operations of pre-processing the catalyst metal 301, synthesizing the graphene 302 on the catalyst metal 301, and forming the supporting body 303 on the graphene 302 are performed. Brief descriptions thereof will be given below.

First, the operation of pre-processing the catalyst metal 301 is performed.

The catalyst metal 301 may include at least one selected from among nickel (Ni), cobalt (Co), iron (Fe), platinum (Pt), gold (Au), aluminum (Al), chrome (Cr), copper (Cu), magnesium (Mg), manganese (Mn), rhodium (Rh), silicon (Si), tantalum (Ta), titanium (Ti), tungsten (W), uranium (U), vanadium (V), zirconium (Zr), and combinations thereof.

The catalyst metal 301 may be a single layer or the outermost layer of a multilayer substrate including at least two layers.

The catalyst metal 301 is pre-processed by cleaning a surface thereof before the graphene 302 is formed thereon. The pre-processing operation is performed to remove impurities existing on the surface of the catalyst metal 301 and may be performed by using hydrogen gas. Alternatively, occurrence of defects when the graphene 302 is formed may be prevented by cleaning the surface of the catalyst metal 301 by using acidic or alkaline solution. The pre-processing operation for cleaning the surface of the catalyst metal 301 may be omitted if necessary.

Next, the operation of forming the graphene 302 is performed.

When the catalyst metal 301 is transported to a chamber, a gaseous carbon source is introduced into the chamber and heat treatment is performed. The heat treatment includes heating and cooling. For the formation of graphene, any of various processes, such as chemical vapor deposition (CVD), thermal chemical vapor deposition (TCVD), rapid thermal chemical vapor deposition (PTCVD), inductive coupled plasma chemical vapor deposition (ICP-CVD), atomic layer deposition: ALD), etc., may be performed.

The gaseous carbon source may be one or more selected from a group of carbon-containing materials consisting of methane (CH4), carbon monoxide (CO), ethane ($C_2H_6$), ethylene ($CH_2$), ethanol ($C_2H_5$), acetylene ($C_2H_2$), propane ($CH_3CH_2CH_3$), propylene ($C_3H_6$), butane ($C_4H_{10}$, pentane ($CH_3(CH_2)_3CH_3$), pentene ($C_5H_{10}$), cyclopentadiene ($C_5H_6$), hexane ($C_6H_{14}$), cyclohexane ($C_6H_{12}$), benzene ($C_6H_6$), toluene ($C_7H_8$). Such a gaseous carbon source is divided into carbon atoms and hydrogen atoms at a high temperature.

The carbon atoms are deposited on the heated catalyst metal 301 and are formed as the graphene 302 as the catalyst metal 301 is cooled.

Next, the supporting body 303 is formed on the graphene 302.

The supporting body 303 may be at least one from among polymers including polymethylmethacrylate (PMMA), polyamide (PA), poly(butylenes terephtalate) (pbt), polycarbonate (pc), polyethylene (pe), poly(oxymethylene) (pom), polypropylene (pp), poly(phenylenether) (ppe), polystyrene (ps), polysulfone (psu), liquid crystal polymer (lcp), poly(etheretherketone) (peek), poly(etherimide) (pei), polylactide (pla), poly(dimethylsiloxane) (pdms), and cycloolefin copolymer (coc).

The supporting body 303 is formed on a surface of the graphene 302 on which the catalyst metal 301 is not arranged. The supporting body 303 is formed by drop-coating the surface of the graphene 302 with the polymer in liquefied state and hardening the polymer. The supporting body 303 maintains the shape of the graphene 302 and prevents damages to the graphene 302 by supporting the graphene 302 while the graphene 302 is being transferred.

Hereinafter, the catalyst metal 301, the graphene 302, and the supporting body 303 that are stacked in the order described above will be collectively referred to as a first stacked structure (310 of FIG. 1). Hereinafter, a graphene transfer method according to an embodiment of the present invention will be described in detail with reference to FIGS. 1 through 6.

Referring to FIG. 1, to perform the graphene transfer method according to an embodiment of the present invention, a container 200 for storing a liquid and roll-to-roll equipment 210 for supplying the target film 304 in a first direction are necessary.

The container 200, e.g., a storage tank, stores a liquid such as a catalyst metal removing liquid or a cleaning liquid. Although not shown, the container 200 includes an inlet (not shown) via which a liquid may be supplied to the container 200 and an outlet (not shown) via which a stored liquid may be discharged. Therefore, a liquid stored in the single container 200 may be changed if necessary, and thus, etching of a catalyst metal and cleaning of graphene may be performed at the same location without relocating the target film 304 and the first stacked structure 310.

The roll-to-roll equipment 210 includes at least two unwinding rolls and transporting rollers. The unwinding rolls move the target film 304 in the first direction or a direction opposite to the first direction by winding the target film 304 in a predetermined direction. The transporting rollers maintain a moving direction fixed while the target film 304 is being transported or maintain a tension of the target film 304. The arrangement and numbers of the unwinding rolls and the transporting rollers are not limited to those shown in FIG. 1.

In FIG. 1, the roll-to-roll equipment 210 is arranged outside the container 200. However, the roll-to-roll equipment 210 may also be arranged inside the container 200. The location of the roll-to-roll equipment 210 may vary according to necessity and space utilization of a user.

Meanwhile, although only the roll-to-roll equipment 210 for transporting the target film 304 by using a roll-to-roll method is shown in FIG. 1, additional roll-to-roll equipment for transporting the first stacked structure 310 by using a roll-to-roll method may also be arranged.

In the graphene transfer method, a first end of the first stacked structure 310, in which the catalyst metal 301, the graphene 302, and the supporting body 303 are stacked in the order stated, is attached to a point of the target film 304 that is supplied in the first direction by using the roll-to-roll method.

Figure 2:
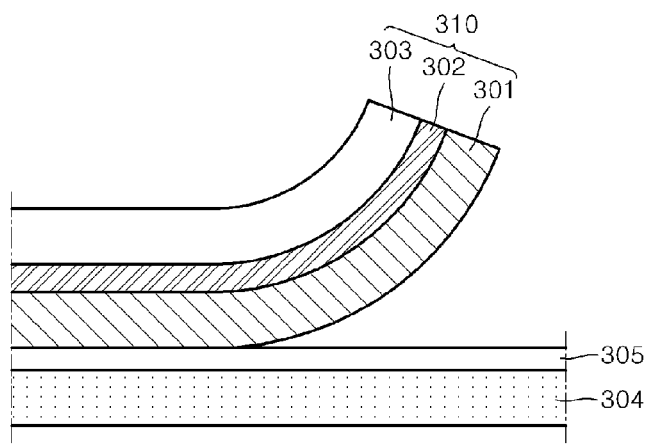
FIG. 2 is a schematic lateral sectional view of graphene corresponding to portion II of FIG. 1.

Referring to FIGS. 1 and 2, the first stacked structure 310 is attached to the target film 304 via an adhesive 305. The adhesive 305 may be a generally known adhesive material, such as silicon, an oil-based adhesive, etc., or a double-sided tape. The first end of the first stacked structure 310 may be the starting end of the first stacked structure 310. By attaching the target film 304 that is supplied in the first direction by using the roll-to-roll method to the first stacked structure 310, the first stacked structure 310 is also transported in the direction in which the target film 304 is transported. As described below, as the target film 304 is transported, the graphene 302 included in the first stacked structure 310 is also transported in the same direction, and thus, the graphene 302 may be automatically transferred in a roll-to-roll manner to the target film 304.

It is necessary to fix the first end of the first stacked structure 310 to the target film 304 until the graphene 302 is completely transferred. Therefore, it is necessary not to submerge the connection of the first stacked structure 310 and the target film 304 into the catalyst metal removing liquid 201 stored in the container 200.

Next, a second stacked structure 320 is formed by removing the catalyst metal 301 of the first stacked structure 310, where the graphene 302 is exposed from a surface of the second stacked structure 320.

Figure 3:
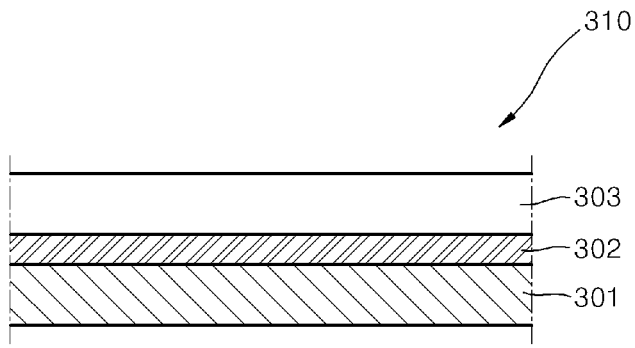
FIG. 3 is a schematic lateral sectional view of graphene corresponding to portion III of FIG. 1.

Referring to FIG. 3, as described above, the first stacked structure 310 includes the catalyst metal 301, the graphene 302, and the supporting body 303 in the order stated.

Referring to FIGS. 1 and 3, to transfer the graphene 302 to the target film 304, it is necessary to expose a surface of the graphene 302 by removing the catalyst metal 301 that is used for synthesis of the graphene 302. Therefore, to remove the catalyst metal 301 of the first stacked structure 310, the first stacked structure 310 is transported to the container 200 which stores the catalyst metal removing liquid 201. The catalyst metal 301 is removed via a wet-etching process as the first stacked structure 310 floated at surface level in the catalyst metal removing liquid 201 in order to contact between the catalyst metal 301 and the catalyst metal removing liquid 201 a, and thus, the second stacked structure 320 is formed.

Figure 4:
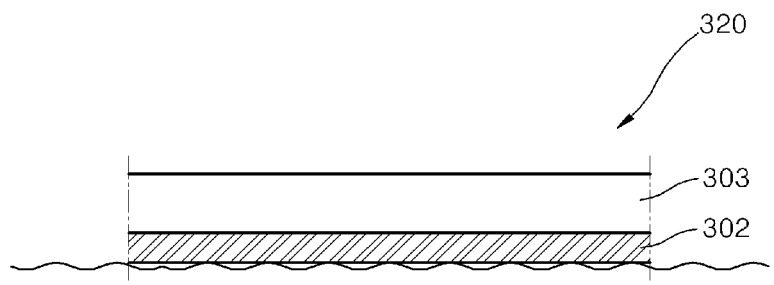
FIG. 4 is a schematic lateral sectional view of graphene corresponding to portion IV of FIG. 1.

The second stacked structure 320 is a structure in which the graphene 302 and the supporting body 303 are stacked in this order after the catalyst metal 301 is removed as shown in FIG. 4.

Meanwhile, since a density of the first stacked structure 310 is smaller than that of the catalyst metal removing liquid 201, the first stacked structure 310 naturally floats at surface level in the catalyst metal removing liquid 201. The catalyst metal removing liquid 201 containing an acidic solution reacts with the catalyst metal 301, and thus, the catalyst metal 301 is removed.

The catalyst metal removing liquid 201 contains at least one form among hydrogen fluoride (HF), iron chloride ($FeCl_3$), iron nitride ($Fe(No_3)_3$), copper chloride ($CuCl_2$), ammonium persulfate ($(NH_4)_2S_2O_8$), sodium persulfate ($Na_2S_2O_8$) solution, and a hydrogen peroxide/sulfuric acid type solution.

Next, as the target film 304 is transported in a roll-to-roll manner in the first direction, the second stacked structure 320 is also transported in the same direction, and thus, the exposed graphene is transferred to a transfer surface of the target film 304.

In detail, when an unwinding roll rotates in a predetermined direction, the target film 304 is transported in the first direction. Meanwhile, as described above, since a portion of the target film 304 is attached to the first end of the first stacked structure 310 (in FIG. 2), the second stacked structure 320, which corresponds to the first stacked structure 310 after the catalyst metal 301 is removed, is transported in the same direction as the target film 304 is transported.

Figure 5:
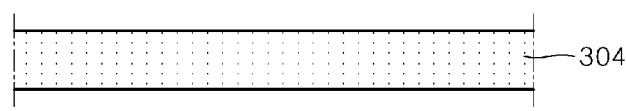
FIG. 5 is a schematic lateral sectional view of graphene corresponding to portion V of FIG. 1.

FIG. 5 shows the target film 304. The target film 304 may be at least one from among polyethylene terephthalate (PET), polyimide (PI), polydimethylsiloxane (PDMS), plastic, synthetic rubber, and natural rubber.

Figure 6:
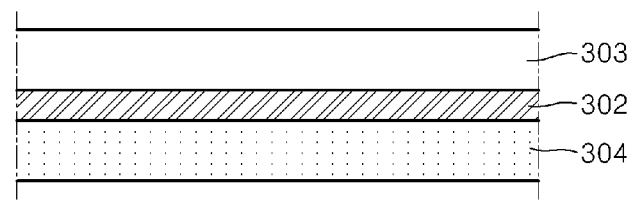
FIG. 6 is a schematic lateral sectional view of graphene corresponding to portion VI of FIG. 1.

As the target film 304 and the second stacked structure 320 are transported in a same direction, the graphene 302 is primarily transferred to the transfer surface of the target film 304. FIG. 6 shows that the graphene 302 is transferred to the target film 304.

Since the graphene 302 has a hydrophobic property, even if only a portion the graphene 302 contacts the transfer surface of the target film 304, the graphene 302 is flatly and uniformly transferred to the transfer surface of the target film 304 due to the surface tension.

According to an embodiment of the present invention, as the target film 304 is transported by using the roll-to-roll method and the second stacked structure 320 is transported in the same direction as the target film 304, removal of the catalyst metal 301 and transfer of the graphene 302 are automatically performed. Furthermore, by using the same method, a large-sized film containing graphene may be acquired.

Figure 7:
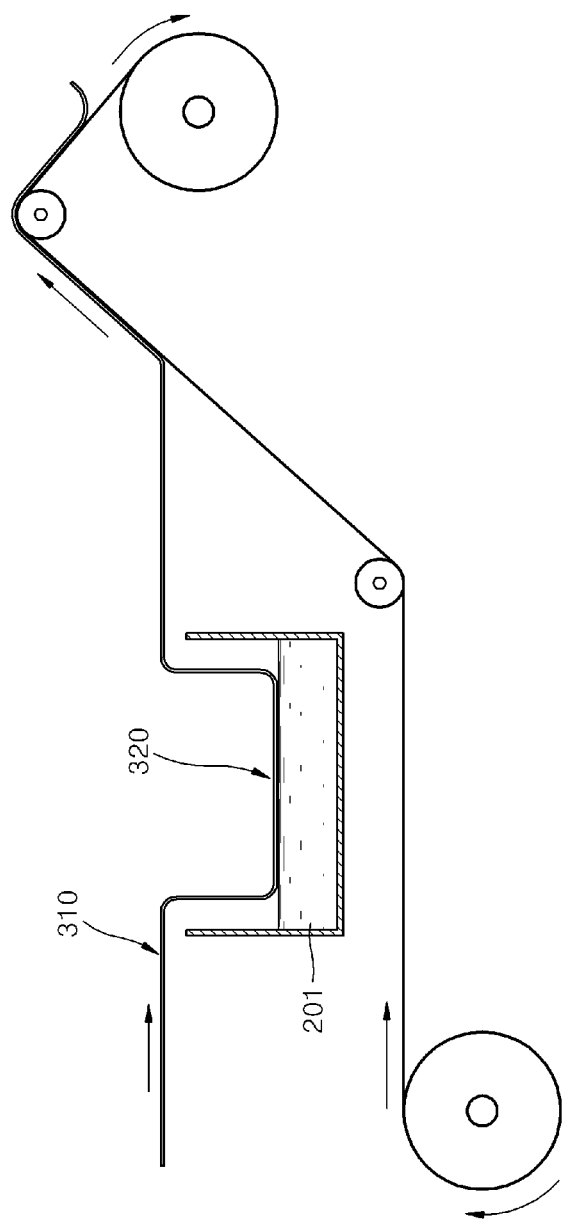
FIGS. 7 through 9 are schematic diagrams sequentially showing the graphene transfer method of FIG. 1.
Figure 8:
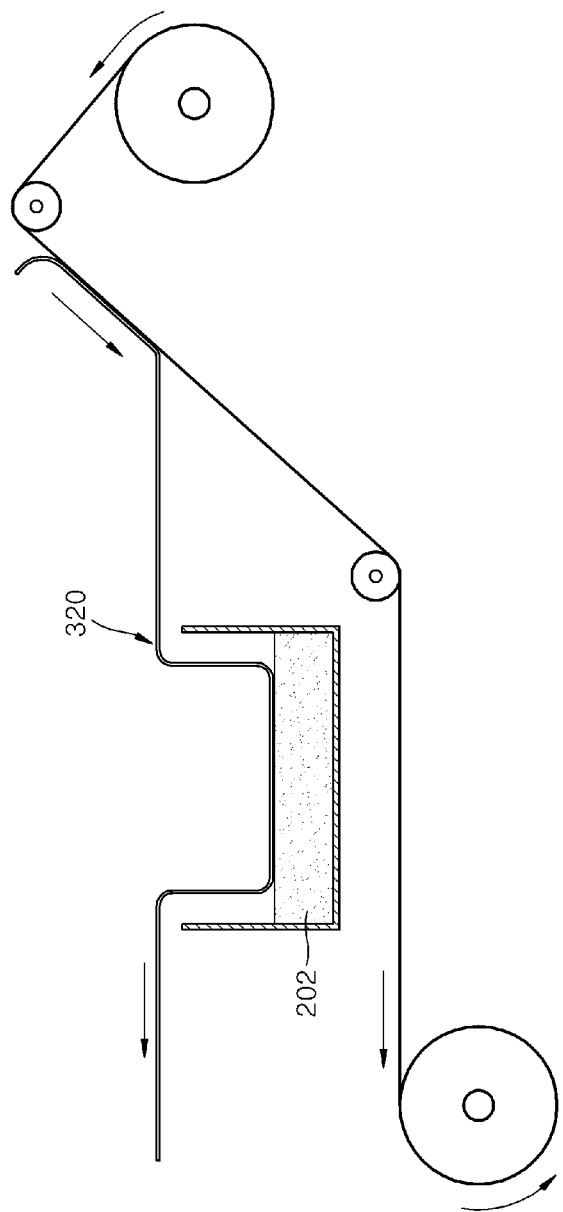
Figure 9:
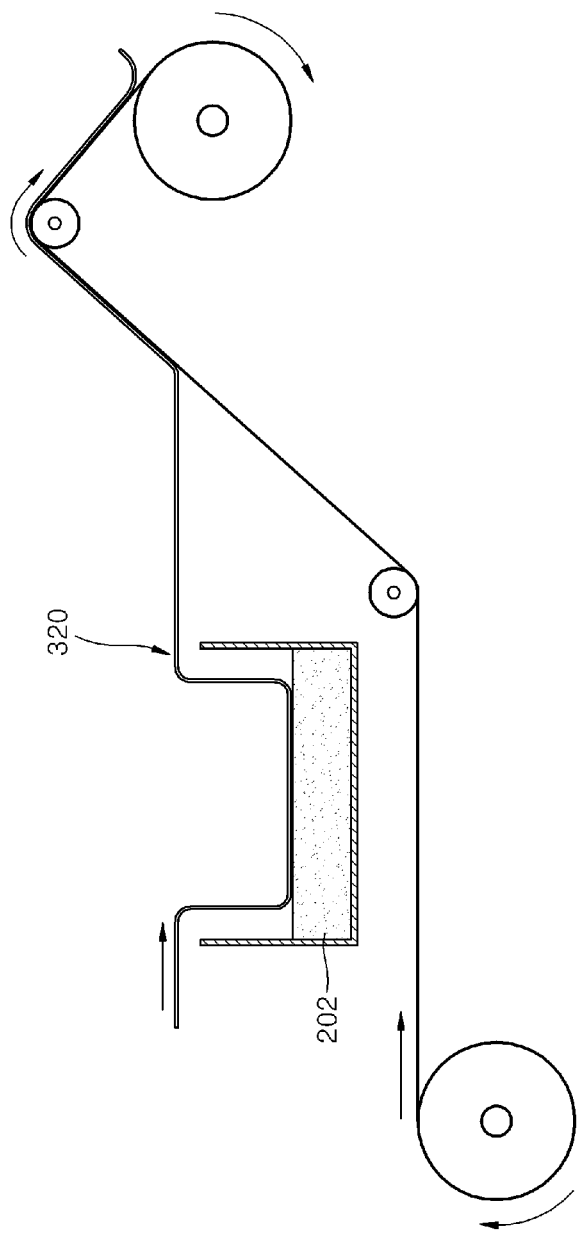
Figure 9:
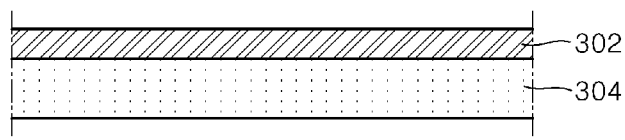

FIGS. 7 through 9 are schematic diagrams sequentially showing the graphene transfer method of FIG. 1.

FIG. 7 shows the same process as shown in FIG. 1, that is, the process of primarily transferring graphene to a target film. Therefore, a detailed description thereof will be omitted.

FIG. 8 shows an operation of cleaning the primarily transferred graphene.

Referring to FIG. 8, the target film 304 is transported in a roll-to-roll manner in a direction opposite to the first direction. Therefore, the second stacked structure 320 is also transported in the direction opposite to the first direction. As a result, the graphene 302 transferred to the target film 304 is separated from the target film 304, is floated at surface level in a cleaning liquid 202, and is cleaned.

The operation shown in FIG. 8 is an operation of removing the catalyst metal removing liquid 201 remaining on the graphene 302. If the catalyst metal removing liquid 201 remains on the graphene 302, electric properties of the graphene 302 deteriorate when the graphene 302 is used in a display transparent electrode or a solar battery and purity of the graphene 302 is ruined. Therefore, it is necessary to clean the graphene 302.

According to an embodiment of the present invention, due to the hydrophobic property of the graphene 302 and surface tension between the graphene 302 and the target film 304, the primarily transferred graphene 302 may be moved to the surface of the cleaning liquid 202.

Meanwhile, before performing the operation shown in FIG. 8, it is necessary to discharge the catalyst metal removing liquid 201 from the container 200 and fill the container 200 with the cleaning liquid 202. Here, the cleaning liquid 202 may be distilled water, de-ionized (D.I.) water, etc.

Next, referring to FIG. 9, the graphene 302 is secondarily transferred in the same manner as shown in FIG. 7.

In detail, the target film 304 is transported in a roll-to-roll manner in the first direction again. Therefore, the second stacked structure 320 is also transported in the first direction, and thus, the cleaned graphene 302 is transferred back to the transfer surface of the target film 304.

Next, although not shown, after the graphene 302 is finally transferred, the supporting body 303 is removed by using a supporting body removing liquid.

The supporting body 303 may be removed by using an organic solvent, such as acetone. In other word, compared to the related art, a thermal release tape is not used, and thus, the supporting body 303 may be removed without applying predetermined heat and pressure. Therefore, compared to the related art, graphene is not damaged, and thus, deterioration of electric properties of graphene may be prevented.

FIG. 10 is a lateral sectional view of the target film 304 after the supporting body 303 is removed and the target film 304 is coated with the graphene 302. The target film 304 coated with the graphene 302 may be used as a transparent electrode film for a flexible display apparatus, an organic light emitting device, a solar battery, etc.

Next, although not shown, a graphene doping operation and a drying operation may be further performed. Furthermore, an analyzing operation may also be performed.

As described above, according to the one or more of the above embodiments of the present invention, since an operation of etching a catalyst metal and an operation for transferring graphene are performed while graphene is being transported in a roll-to-roll manner in a direction, target films to which graphene is transferred may be mass-produced. Furthermore, since graphene is transferred by using a polymer supporting body and the polymer supporting body used for transferring the graphene may be removed without applying a predetermined heat and pressure, damages to the transferred graphene may be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

INDUSTRIAL APPLICABILITY

One or more embodiments of the present invention relate to a graphene transfer method for automating the transfer of graphene.

The invention claimed is:

1. A graphene transfer method comprising:
attaching a first end of a first stacked structure, including a catalyst metal, graphene, and a supporting body stacked in the order stated, to a point of a target film that is transported in a roll-to-roll manner in a first direction;
forming a second stacked structure by removing the catalyst metal of the first stacked structure, the second stacked structure having a surface whereon the graphene is exposed; and
transferring the exposed graphene to a transfer surface of the target film by transporting the target film in a roll-to-roll manner and the second stacked structure in the first direction,
wherein the catalyst metal is removed via a wet-etching process by floating the first stacked structure at surface level in a catalyst metal removing liquid, and
wherein the method further comprises:
after the transferring of the graphene, transporting the target film in a roll-to-roll manner and the second stacked structure in a direction opposite to the first direction and cleaning the graphene transferred to the target film by floating the graphene on the surface of a cleaning liquid; and
transferring the cleaned graphene back to the transfer surface of the target film by transporting the target film in a roll-to-roll manner and the second stacked structure in the first direction.

2. The graphene transfer method of claim 1, wherein the wet-etching process is performed by using at least one from among hydrogen fluoride (HF), iron chloride ($FeCl_3$), iron nitride ($Fe(No_3)_3$), copper chloride ($CuCl_2$), ammonium persulfate ($(NH_4)_2S_2O_8$), sodium persulfate ($Na_2S_2O_8$) solution, and a hydrogen peroxide/sulfuric acid type solution.

3. The graphene transfer method of claim 1, wherein a container is filled with the catalyst metal removing liquid after the catalyst metal is removed, and
the catalyst metal removing liquid is discharged from the container and the container is filled with the cleaning liquid before the cleaning of the graphene.

4. The graphene transfer method of claim 3, wherein roll-to-roll equipment for transporting the target film in a roll-to-roll manner is arranged inside or outside the container.

5. The graphene transfer method of claim 1, wherein the supporting body is formed of at least one from among polymers including polymethylmethacrylate (PMMA), polyamide (PA), poly(butylenes terephtalate) (PBT), polycarbonate (PC), polyethylene (PE), poly(oxymethylene) (POM), polypropylene (PP), poly(phenylenether) (PPE), polystyrene (PS), polysulfone (PSU), liquid crystal polymer (LCP), poly(etheretherketone) (PEEK), poly(etherimide) (PEI), polylactide (PLA), poly(dimethylsiloxane) (PDMS), and cycloolefin copolymer (COC).

6. The graphene transfer method of claim 1, wherein, further comprising:
after the transferring of the graphene, removing the supporting body by using a supporting body removing liquid.

7. The graphene transfer method of claim 1, wherein the catalyst metal comprises at least one selected from among nickel (Ni), cobalt (Co), iron (Fe), platinum (Pt), gold (Au), aluminum (Al), chrome (Cr), copper (Cu), magnesium (Mg), manganese (Mn), rhodium (Rh), silicon (Si), tantalum (Ta), titanium (Ti), tungsten (W), uranium (U), vanadium (V), zirconium (Zr), and combinations thereof.

8. The graphene transfer method of claim 1, wherein the target film contains at least one from among polyethylene terephthalate (PET), polyimide (PI), polydimethylsiloxane (PDMS), plastic, synthetic rubber, and natural rubber.

* * * * *